No. 866,805. PATENTED SEPT. 24, 1907.
J. C. ORRISON.
BRAKE LEVER.
APPLICATION FILED OCT. 30, 1906.
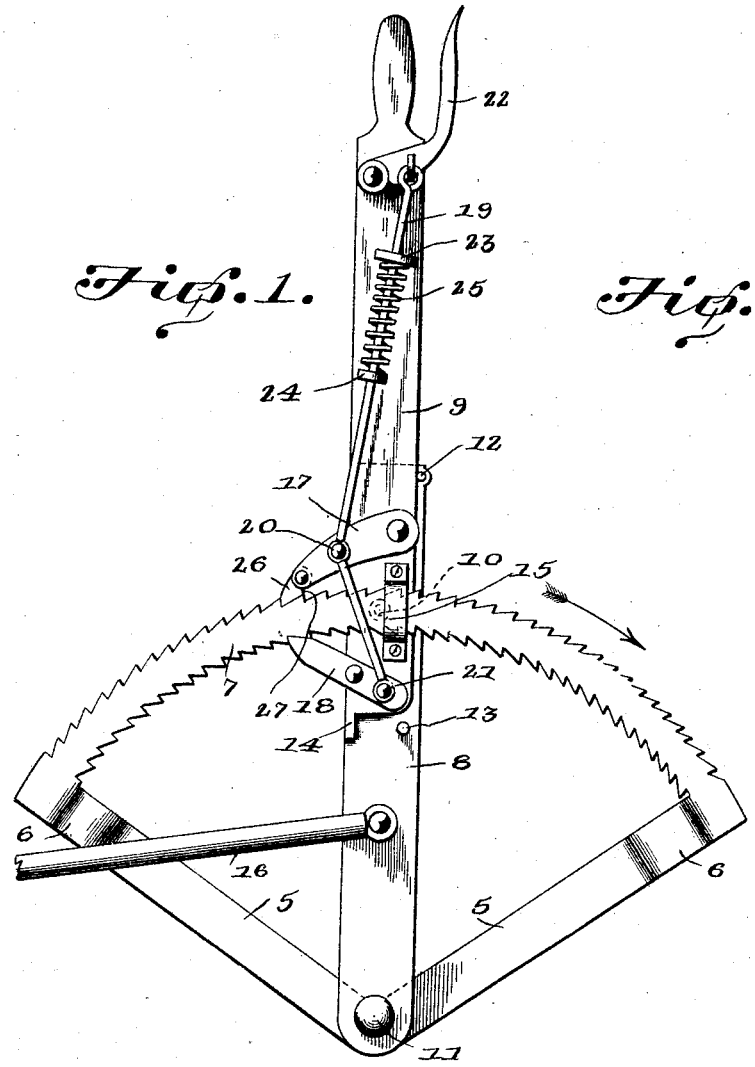
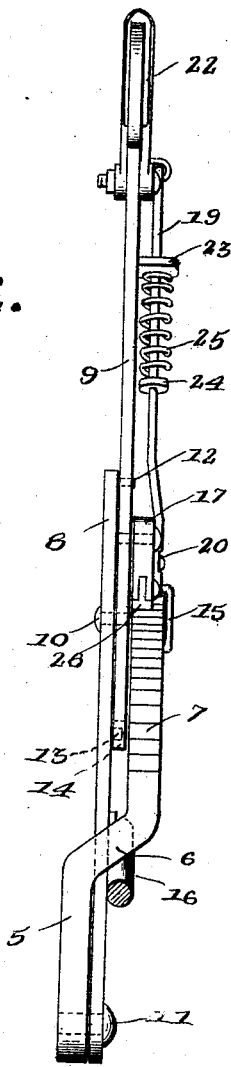
Witnesses
W. S. Rockwell
F. G. Smith
Inventor
Joseph C. Orrison
By Chandler Chandler
Attorneys

UNITED STATES PATENT OFFICE.

JOSEPH C. ORRISON, OF LEIGHS, VIRGINIA.

BRAKE-LEVER.

No. 866,805. Specification of Letters Patent. Patented Sept. 24, 1907.

Application filed October 30, 1906. Serial No. 341,236.

*To all whom it may concern:*

Be it known that I, JOSEPH C. ORRISON, a citizen of the United States, residing at Leighs, in the county of Fairfax, State of Virginia, have invented certain new and useful Improvements in Brake-Levers; and I do hereby declare the following to be a full, clear, and exact description of the invention, such as will enable others skilled in the art to which it appertains to make and use the same.

This invention relates to brake levers, and more particularly to brake levers of the hand type.

The primary object of the invention is to provide a brake lever of such construction that the braking action may be increased after the brake has been applied by merely rocking the lever backwards and forwards alternately.

In the forms of brakes now on the market it is necessary, in order to increase the braking action, to release the pull mechanism of the brake lever either partly or entirely and as this results in a loss of time, which loss may be a dangerous one in some cases, such brakes have not been found to be very satisfactory.

Broadly speaking, my invention resides in the provision of a two-part brake lever, the sections of which are pivotally connected with each other and the lower section connected pivotally with the segmental rack in connection with which the lever is to be used, and in providing upon the member which is pivoted to the rack, means for preventing relative movement of the lever sections in one direction and permitting limited relative movement of the same in the other direction, there being pawls pivoted to the other lever section above and below the rack segment for engagement with the upper and lower edges respectively of the same. The arrangement of parts thus briefly described is such that when the lever has been rocked forwardly to set the brake, and it is desired to increase the braking action, the lever may be pulled slightly rearwardly which will cause relative movement of the lever sections and permit the lower pawl to ride into engagement with the next tooth of the rack segment, after which the lever may be pushed forwardly causing the upper pawl to move correspondingly, it being observed that in this manner the braking action may be increased by jacking the lever instead of actuating the same with a continuous pull or push and that hence a greater braking action can be secured than would otherwise be possible.

In the accompanying drawings: Figure 1 is a side elevation of a brake lever constructed in accordance with my invention. Fig. 2 is an edge view thereof.

Referring more specifically to the drawings, the segmental rack, in connection with which the brake lever is used, is indicated by the numeral 5 and includes the usual upwardly diverging portions which are turned laterally and upwardly as at 6 adjacent their upper ends and are connected at their said ends by the rack segment 7.

The lever embodying my invention comprises a pair of sections 8 and 9 which are pivotally connected as at 10, the said pivotal point of the lever sections being located at a point adjacent the meeting ends of each of the lever sections and the said sections being overlapped at their said ends. The lever section 8, which is the lower one of the two sections is pivoted at its lower end as at 11 to the segmental rack 5 at the point of junction of the upwardly diverging members thereof and is of slightly greater width than the upper lever section 9, and projecting from the upper end of that face of the lever section 8 which lies against the upper section 9 is a pin 12 which serves to limit the relative movement of the lever sections upon their mutual pivot in one direction. A second pin 13 also projects from this face of the lower lever section 8 and in the path of movement of a lug 14 which is formed at the lower end of the upper section 9 at that side of the same opposite the side at which the pin is located, this construction serving to permit relative limited movement of the lever sections 8 and 9 in one direction.

A clip 15 is secured to the upper lever section 9 adjacent the lower end thereof and confines the rack segment 7 between its body portion and the said lever section to which it is attached so that the lever sections may be guided in their rocking movement and held in proper relation with respect to the said rack segment, and connected with the lower lever section 8 above its pivot point 11 is a rod 16 which is connected at its opposite end with the brake beam, not shown, of the brake mechanism.

Both the upper and lower edges of the rack segment 7 are toothed, as shown in Fig. 1 of the drawings, and pivoted at one of its ends to the upper lever section 9 above the rack segment is a pawl 17 which is designed for interchangeable engagement with the rack teeth upon the upper edge of the rack segment, and pivoted intermediate its ends to the said upper lever section 9 adjacent the lower end thereof and beneath the rack segment is a pawl 18 which is designed for engagement interchangeably with the rack teeth upon the under edge of the rack segment 7. In order that the pawls 17 and 18 may be simultaneously operated, I provide a rod 19 which is pivotally connected as at 20 with the pawl 17 intermediate its ends and which is bent at its point of pivotal connection to extend at an angle to its main portion and is pivotally connected at its lower end as at 21 to the pawl 18 to that side of the pivot point of the pawl opposite the end of the same which engages the rack teeth. At its upper end the rod 19 is pivotally connected with a pivoted hand grip 22 by means of which it may be moved to actuate the pawls, and in order to hold the rod to the downward limit of its movement and hence normally hold the pawls in engagement with the teeth of the rack segment, the rod 19 is engaged through an eye member 23 formed on the upper lever section 9 and is provided with a collar 24 and a spring 25 which is engaged upon the rod and has one of its ends bearing against the eye member 23 and its opposite end against the collar 24. The outer end of the pawl 17 is bifurcated, and pivoted in the bifurcation is a trip 26 which is permitted to swing when the pawl is raised but is limited in this movement by a shoulder 27 which is formed upon it and is designed to abut the under edge of the pawl.

From the foregoing description of my invention, it will be seen that to apply the brake, the lever is rocked in the direction of the arrow in Fig. 1 and that by reason of the fact that the upper lever section 9 engages the pin 12, the lever sections will be moved in unison. After having thus applied the brake, should it become necessary to increase the braking force, the upper lever section 9 is rocked to a slight degree in the opposite direction to that in which the arrow points and hence the lower lever section 8 is rocked in the opposite direction sufficiently to allow the pawl 18 to engage the next rack tooth of the rack segment 7, the pawl 17 being slightly raised if found necessary to give a greater leverage. The upper lever section 9 is then rocked in the direction of the arrow to cause the trip 26 to engage the next succeeding tooth at the upper edge of the rack segment, and this jacking operation is repeated until sufficient force has been exerted upon the brakes.

Having thus described the invention, what is claimed is:

1. A mechanism of the class described comprising a segmental rack, a lever comprising pivoted sections, one of the lever sections being pivoted to the rack, means carried by the said sections for preventing relative movement of the sections in one direction, means carried by the other lever section for limiting the relative movement of the lever sections in the opposite direction, and pawls pivoted to the last-named section in position to engage opposite edges of the rack segment.

2. A mechanism of the class described comprising a segmental rack, a lever comprising pivoted sections, one of the lever sections being pivoted to the rack, means carried by the said section for preventing relative movement of the sections in one direction, means carried by the other lever section for limiting the relative movement of the lever sections in the opposite direction, and pawls pivoted to the last named section in position to engage opposite edges of the rack segment, one of the said pawls having a pivoted point.

In testimony whereof, I affix my signature, in presence of two witnesses.

JOSEPH C. ORRISON.

Witnesses:
R. S. CRIPPEN,
W. I. ROBEY, Jr.